(12) United States Patent
Shkembi

(10) Patent No.: US 9,960,482 B2
(45) Date of Patent: *May 1, 2018

(54) WINDOW ASSEMBLY WITH TRANSPARENT REGIONS HAVING A PERFORMANCE ENHANCING SLIT FORMED THEREIN

(71) Applicants: AGC Automotive Americas R&D, Inc., Ypsilanti, MI (US); AGC Flat Glass North America, Inc., Alpharetta, GA (US)

(72) Inventor: Ledion Shkembi, Lincoln Park, MI (US)

(73) Assignees: AGC AUTOMOTIVE AMERICAS R&D, INC., Ypsilanti, MI (US); AGC FLAT GRASS NORTH AMERICA, INC., Alpharetta, GA (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/772,166

(22) PCT Filed: Feb. 3, 2014

(86) PCT No.: PCT/US2014/014430
§ 371 (c)(1),
(2) Date: Sep. 2, 2015

(87) PCT Pub. No.: WO2014/149201
PCT Pub. Date: Sep. 25, 2014

(65) Prior Publication Data
US 2016/0013539 A1  Jan. 14, 2016

Related U.S. Application Data

(60) Provisional application No. 61/793,958, filed on Mar. 15, 2013.

(51) Int. Cl.
*H01Q 1/12* (2006.01)
*H01Q 1/32* (2006.01)
(Continued)

(52) U.S. Cl.
CPC ..... *H01Q 1/3291* (2013.01); *B32B 17/10036* (2013.01); *B32B 17/10174* (2013.01);
(Continued)

(58) Field of Classification Search
CPC ......... B60J 1/20; H01Q 1/1271; H01Q 1/325; H01Q 1/3291; H01Q 21/28; H01Q 5/364; H01Q 5/40; H01Q 9/40
(Continued)

(56) References Cited

U.S. PATENT DOCUMENTS 3,177,489 A   4/1965 Saltzberg
3,359,555 A   12/1967 Taylor
(Continued)

FOREIGN PATENT DOCUMENTS

CN   1964132 A    5/2007
CN   102407753 A  4/2012
(Continued)

OTHER PUBLICATIONS

English language abstract and machine-assisted English translation for CN 1964132 extracted from espacenet.com database on Oct. 10, 2016, 17 pages.
(Continued)

*Primary Examiner* — Tho G Phan
(74) *Attorney, Agent, or Firm* — Howard & Howard Attorneys PLLC

(57) ABSTRACT

A window assembly for a vehicle includes a substrate that is substantially transparent and has a surface. A transparent layer is disposed on the surface and comprises a metal compound such that the transparent layer is electrically
(Continued)

conductive. The transparent layer defines a first region and a second region that are spaced from one another by a section cut that is devoid of the transparent layer. The first and second regions are substantially congruent to one another and are configured to operate as diversity antenna elements. A feeding arrangement is coupled to the first and second regions to energize the first and second regions. At least one of the first and second regions defines a performance enhancing slit that is devoid of the transparent layer. The slit is configured to operate as at least one of an impedance matching element and a radiation pattern altering element.

30 Claims, 11 Drawing Sheets

(51) Int. Cl.
| G02B 5/20 | (2006.01) |
| B32B 17/10 | (2006.01) |
| H01Q 9/40 | (2006.01) |
| H01Q 21/28 | (2006.01) |
| H01Q 5/364 | (2015.01) |
| H01Q 5/40 | (2015.01) |
| B60J 1/20 | (2006.01) |

(52) U.S. Cl.
CPC .. *B32B 17/10192* (2013.01); *B32B 17/10211* (2013.01); *B32B 17/10761* (2013.01); *B60J 1/20* (2013.01); *G02B 5/208* (2013.01); *H01Q 1/1271* (2013.01); *H01Q 1/325* (2013.01); *H01Q 5/364* (2015.01); *H01Q 5/40* (2015.01); *H01Q 9/40* (2013.01); *H01Q 21/28* (2013.01)

(58) Field of Classification Search
USPC .......................... 343/704, 711, 712, 713, 725
See application file for complete search history.

(56) References Cited

U.S. PATENT DOCUMENTS

| 3,603,886 A | 9/1971 | Norrs |
| 3,670,335 A | 6/1972 | Hirsch |
| 3,870,996 A | 3/1975 | Miller |
| 3,928,748 A | 12/1975 | Sauer |
| 3,964,065 A | 6/1976 | Roberts et al. |
| 4,051,474 A | 9/1977 | Mack et al. |
| 4,057,803 A | 11/1977 | Coleman |
| 4,085,368 A | 4/1978 | Yeh |
| 4,103,304 A | 7/1978 | Burnham et al. |
| 4,189,733 A | 2/1980 | Malm |
| 4,220,954 A | 9/1980 | Marchand |
| 4,225,870 A | 9/1980 | Marner et al. |
| 4,280,128 A | 7/1981 | Masak |
| 4,298,873 A | 11/1981 | Roberts |
| 4,308,541 A | 12/1981 | Seidel et al. |
| 4,313,116 A | 1/1982 | Powell et al. |
| 4,408,205 A | 10/1983 | Hockham |
| 4,584,581 A | 4/1986 | Teshirogi |
| 4,704,724 A | 11/1987 | Krishnan et al. |
| 4,704,734 A | 11/1987 | Menich et al. |
| 4,803,492 A | 2/1989 | Inaba et al. |
| 4,814,777 A | 3/1989 | Monser |
| 4,821,039 A | 4/1989 | Crane |
| 4,849,766 A | 7/1989 | Inaba et al. |
| 4,849,992 A | 7/1989 | Alderman et al. |
| 4,864,316 A | 9/1989 | Kaoru et al. |
| 5,012,255 A * | 4/1991 | Becker ................ H01Q 1/1278 343/704 |
| 5,068,668 A | 11/1991 | Tsuda et al. |
| 5,107,273 A | 4/1992 | Roberts |
| 5,117,236 A | 5/1992 | Chang et al. |
| 5,317,288 A | 5/1994 | Yung et al. |
| 5,377,035 A | 12/1994 | Wang et al. |
| 5,515,059 A | 5/1996 | How et al. |
| 5,517,686 A | 5/1996 | Kennedy et al. |
| 5,528,314 A | 6/1996 | Nagy et al. |
| 5,568,158 A | 10/1996 | Gould |
| 5,600,333 A | 2/1997 | Justice et al. |
| 5,603,107 A | 2/1997 | Gottfried et al. |
| 5,710,995 A | 1/1998 | Akaiwa et al. |
| 5,760,740 A | 6/1998 | Blodgett |
| 5,818,385 A | 10/1998 | Bartholomew |
| 5,898,405 A | 4/1999 | Iwasaki |
| 5,898,407 A * | 4/1999 | Paulus ................ B32B 17/10 343/713 |
| 5,909,191 A | 6/1999 | Hirshfield et al. |
| 5,999,138 A | 12/1999 | Ponce de Leon |
| 6,002,672 A | 12/1999 | Todd |
| 6,018,315 A | 1/2000 | Ince et al. |
| 6,064,865 A | 5/2000 | Kuo et al. |
| 6,087,986 A | 7/2000 | Shoki et al. |
| 6,111,552 A | 8/2000 | Gasser |
| 6,121,925 A | 9/2000 | Hilliard |
| 6,125,109 A | 9/2000 | Fuerter |
| 6,144,339 A | 11/2000 | Matsumoto et al. |
| 6,172,970 B1 | 1/2001 | Ling et al. |
| 6,175,723 B1 | 1/2001 | Rothwell, III |
| 6,191,746 B1 | 2/2001 | Nagy |
| 6,229,840 B1 | 5/2001 | Ichihara |
| 6,236,839 B1 | 5/2001 | Gu et al. |
| 6,266,023 B1 | 7/2001 | Nagy et al. |
| 6,271,798 B1 | 8/2001 | Endo et al. |
| 6,278,415 B1 | 8/2001 | Matsuyoshi et al. |
| 6,313,807 B1 | 11/2001 | Kolak |
| 6,314,127 B1 | 11/2001 | Lynch et al. |
| 6,317,090 B1 | 11/2001 | Nagy et al. |
| 6,320,276 B1 | 11/2001 | Sauer |
| 6,366,243 B1 | 4/2002 | Isohatala et al. |
| 6,369,756 B1 | 4/2002 | Wang et al. |
| 6,388,621 B1 | 5/2002 | Lynch |
| 6,414,624 B2 | 7/2002 | Endo et al. |
| 6,421,014 B1 | 7/2002 | Sanad |
| 6,448,935 B2 | 9/2002 | Fuchs et al. |
| 6,449,469 B1 | 9/2002 | Miyahara |
| 6,456,257 B1 | 9/2002 | Zamat |
| 6,470,186 B1 | 10/2002 | Whikehart et al. |
| 6,480,526 B1 | 11/2002 | Shoki et al. |
| 6,486,828 B1 | 11/2002 | Cahn et al. |
| 6,535,168 B1 | 3/2003 | Marumoto et al. |
| 6,559,798 B1 | 5/2003 | Marumoto et al. |
| 6,563,860 B2 | 5/2003 | Schilling |
| 6,577,353 B1 | 6/2003 | Welles, II et al. |
| 6,646,614 B2 | 11/2003 | Killen |
| 6,661,386 B1 | 12/2003 | Petros et al. |
| 6,731,940 B1 | 5/2004 | Nagendran |
| 6,768,457 B2 | 7/2004 | Lindenmeier |
| 6,809,692 B2 | 10/2004 | Puente Baliarda et al. |
| 6,816,116 B2 | 11/2004 | Chen |
| 6,831,611 B2 | 12/2004 | Ooe et al. |
| 6,836,258 B2 | 12/2004 | Best et al. |
| 6,867,739 B2 | 3/2005 | Prassmayer et al. |
| 6,885,349 B2 | 4/2005 | Hickel |
| 6,925,293 B2 | 8/2005 | Lindenmeier et al. |
| 6,952,587 B2 | 10/2005 | Whikehart et al. |
| 6,959,175 B2 | 10/2005 | Ohtaki |
| 6,973,138 B1 | 12/2005 | Wright |
| 6,977,611 B1 | 12/2005 | Crabb |
| 7,015,861 B2 | 3/2006 | Boyd et al. |
| 7,016,399 B1 | 3/2006 | Vadgama et al. |
| 7,075,485 B2 | 7/2006 | Song et al. |
| 7,088,104 B2 | 8/2006 | Bottomley |
| 7,099,415 B2 | 8/2006 | Ohsawa |
| 7,099,644 B2 | 8/2006 | Whikehart et al. |
| 7,113,748 B2 | 9/2006 | Shapira et al. |
| 7,119,751 B2 | 10/2006 | Li et al. |
| 7,126,553 B1 | 10/2006 | Fink et al. |
| 7,149,480 B2 | 12/2006 | Miyahara |
| 7,170,465 B2 | 1/2007 | Rofougaran |
| 7,200,368 B1 | 4/2007 | Hottinen et al. |
| 7,209,096 B2 | 4/2007 | Chau |

(56) References Cited

U.S. PATENT DOCUMENTS

| | | |
|---|---|---|
| 7,224,319 B2 | 5/2007 | Kubba et al. |
| 7,256,649 B2 | 8/2007 | Ksienski et al. |
| 7,289,073 B2 * | 10/2007 | Song .................... H01Q 1/1271 343/711 |
| 7,289,074 B2 | 10/2007 | Yamaguchi |
| 7,308,020 B2 | 12/2007 | Ishii et al. |
| 7,310,503 B2 | 12/2007 | Ido |
| 7,345,626 B2 | 3/2008 | Smith et al. |
| 7,366,139 B2 | 4/2008 | Poegel et al. |
| 7,369,832 B2 | 5/2008 | Cho |
| 7,498,993 B1 | 3/2009 | Lee et al. |
| 7,522,899 B1 | 4/2009 | He |
| 7,545,333 B2 | 6/2009 | Li et al. |
| 7,564,407 B2 | 7/2009 | Yoshizoe et al. |
| 7,596,168 B2 | 9/2009 | Saito |
| 7,656,357 B2 | 2/2010 | Ishibashi et al. |
| 7,919,997 B2 | 4/2011 | Obkircher |
| 8,036,319 B2 | 10/2011 | Arambepola et al. |
| 8,086,203 B2 | 12/2011 | Gonikberg |
| 8,385,868 B2 | 2/2013 | Lee et al. |
| 8,466,842 B2 | 6/2013 | Dai |
| 8,515,378 B2 | 8/2013 | Lee et al. |
| 8,576,130 B2 | 11/2013 | Dai |
| 8,692,716 B2 | 4/2014 | Biris et al. |
| 8,948,702 B2 | 2/2015 | Lee et al. |
| 8,994,598 B2 | 3/2015 | Ogino et al. |
| 9,088,069 B2 | 7/2015 | Bungo |
| 9,094,115 B2 | 7/2015 | Lee et al. |
| 9,293,813 B2 * | 3/2016 | Shkembi ............... H01Q 1/3291 |
| 2001/0022557 A1 | 9/2001 | Rouphael et al. |
| 2003/0186660 A1 | 10/2003 | Lee |
| 2004/0130496 A1 | 7/2004 | Iijima et al. |
| 2004/0190065 A1 | 9/2004 | Shimizu |
| 2004/0190658 A1 | 9/2004 | Ohtaki et al. |
| 2004/0229588 A1 | 11/2004 | Cho |
| 2005/0117545 A1 | 6/2005 | Wittwer et al. |
| 2006/0172710 A1 | 8/2006 | Cahana et al. |
| 2008/0094276 A1 | 4/2008 | Kegel |
| 2008/0119148 A1 | 5/2008 | Ray |
| 2008/0129616 A1 | 6/2008 | Li et al. |
| 2008/0169989 A1 | 7/2008 | Li et al. |
| 2008/0238773 A1 | 10/2008 | Yoshizoe et al. |
| 2009/0042529 A1 | 2/2009 | Lindenmeier et al. |
| 2009/0116586 A1 | 5/2009 | Arambepola et al. |
| 2010/0317306 A1 | 12/2010 | Lee et al. |
| 2010/0317309 A1 | 12/2010 | Lee et al. |
| 2011/0279335 A1 | 11/2011 | Degen et al. |
| 2012/0098716 A1 | 4/2012 | Dai |
| 2012/0108178 A1 | 5/2012 | Lee et al. |
| 2013/0038492 A1 | 2/2013 | Abe |
| 2013/0285861 A1 | 10/2013 | Kagaya |
| 2014/0266931 A1 | 9/2014 | Shkembi |

FOREIGN PATENT DOCUMENTS

| | | | |
|---|---|---|---|
| EP | 1 032 073 A2 | 8/2000 | |
| EP | 1 091 447 A1 | 4/2001 | |
| EP | 1 480 367 A2 | 11/2004 | |
| JP | S62045201 A | 2/1987 | |
| JP | S 63-038306 A | 2/1988 | |
| JP | H 03-204202 A | 9/1991 | |
| JP | H 08-148921 A | 6/1996 | |
| JP | 2001185928 A | 7/2001 | |
| JP | 2004-328357 A | 11/2004 | |
| WO | WO 2012/079040 A1 | 6/2012 | |
| WO | WO2012078979 A1 * | 6/2012 | ............... H01Q 1/12 |
| WO | WO 2012/090883 A1 | 7/2012 | |

OTHER PUBLICATIONS

English language abstract and machine-assisted English translation for JPS 63-038306 extracted from espacenet.com database on Aug. 17, 2016, 8 pages.

English language abstract and machine-assisted English translation for JPH 03-204202 extracted from espacenet.com database on Aug. 17, 2016, 6 pages.

English language abstract and machine-assisted English translation for JPH 08-148921 extracted from espacenet.com database on Aug. 17, 2016, 13 pages.

International Search Report for Application No. PCT/US2010/038673 dated Oct. 25, 2010, 3 pages.

International Search Report for Application No. PCT/US2010/038669 dated Oct. 26, 2010, 3 pages.

International Search Report for Application No. PCT/US2010/038685 dated Oct. 28, 2010, 3 pages.

International Search Report for Application No. PCT/US2014/014430 dated May 22, 2014, 3 pages.

International Search Report for Application No. PCT/US2014/014439 dated Jun. 20, 2014, 5 pages.

Chung-Ning Zhang et al., "A Low-Complexity Antenna Diversity Receiver Suitable for TDMA Handset Implemetation", Vehicular Technology Conference, IEEE 47th, May 4, 1997, vol. 3, pp. 1753-1757, ISBN: 978-0-7803-3659-9, XP010229068.

English language abstract and machine-assisted English translation for CN 102407753 extracted from espacenet.com database on Sep. 10, 2015, 20 pages.

English language abstract and machine-assisted English translation for JP 2004-328357 extracted from espacenet.com database on Sep. 14, 2015, 27 pages.

English language abstract for WO 2012/090883 extracted from espacenet.com database on Sep. 10, 2015, 1 page.

English language abstract and machine-assisted English translation for JPS 62-045201 extracted from espacenet.com database on Jan. 5, 2018, 5 pages.

English language abstract and machine-assisted English translation for JP 2001-185928 extracted from espacenet.com database on Jan. 5, 2018, 11 pages.

\* cited by examiner

Phi / Degree vs. dB

US 9,960,482 B2

WINDOW ASSEMBLY WITH TRANSPARENT REGIONS HAVING A PERFORMANCE ENHANCING SLIT FORMED THEREIN

RELATED APPLICATIONS

This application is the National Stage of International Patent Application No. PCT/US2014/014430, filed on Feb. 3, 2014, which claims priority to and all the advantages claims the benefit of U.S. Provisional Patent Application No. 61/793,958, filed on Mar. 15, 2013, the content of which is incorporated herein by reference.

BACKGROUND OF THE INVENTION

1. Field of the Invention

The subject invention generally relates to a window assembly for a vehicle. More specifically, the subject invention relates to a window assembly having transparent regions with performance enhancing slits formed therein.

2. Description of the Related Art

Recently, there is an increasing demand for vehicle windows to have transparent films or coatings embedded within the windows for various purposes. Such transparent films or coatings often have metal compounds, such as metal oxides, which cause the transparent films or coatings to be electrically conductive. The transparent films or coatings have recently been applied to windows to reflect heat from sunlight penetrating the window. In particular, the transparent films or coatings reflect infrared radiation from sunlight. In so doing, the transparent films or coatings reduce the amount of infrared radiation entering an interior of the vehicle. The transparent films or coatings enable a lower interior temperature as compared to a vehicle having a window with no transparent films or coatings. As a result, during the warm months, less energy is required to lower the interior temperature of the vehicle. To maximize efficiency of the transparent films or coatings to reflect infrared radiation, the transparent films or coatings are often applied over a substantial majority of the window, often covering the entire field of view of the driver or occupant of the vehicle.

It is known to utilize the transparent films or coatings as transparent antenna elements with respect to the window of the vehicle. However, conventional transparent antennas utilized in windows encounter performance degradation as a result of ever-increasing electromagnetic interference. Thus, there remains a need to control radiation patterns and impedance characteristics of such transparent antennas employed on windows. Additionally, conventional transparent antennas utilized in windows are typically configured to operate within only narrow frequency ranges. As such, conventional transparent antennas have limited application.

SUMMARY OF THE INVENTION AND ADVANTAGES

The invention provides a window assembly for a vehicle. In one embodiment, the window assembly includes a substrate that is substantially transparent and has a surface. A transparent layer is disposed on the surface and comprises a metal compound such that the transparent layer is electrically conductive. The transparent layer defines a first region and a second region that are spaced from one another by a section cut that is devoid of the transparent layer. The first and second regions are substantially congruent to one another. A feeding arrangement is coupled to the first and second regions to energize the first and second regions. At least one of the first and second regions defines a performance enhancing slit that is devoid of the transparent layer.

Accordingly, the transparent layer of the window assembly advantageously reflects infrared radiation while simultaneously providing an antenna configuration having broad application. Specifically, the window assembly is able to transmit and/or receive radio signals within a broad range of frequencies. Additionally, the performance enhancing slit advantageously provides greater control over radiation patterns and impedance characteristics of the window assembly. As such, the performance enhancing slit ensures optimal efficiency of the window assembly in transmitting and/or receiving RF signals.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
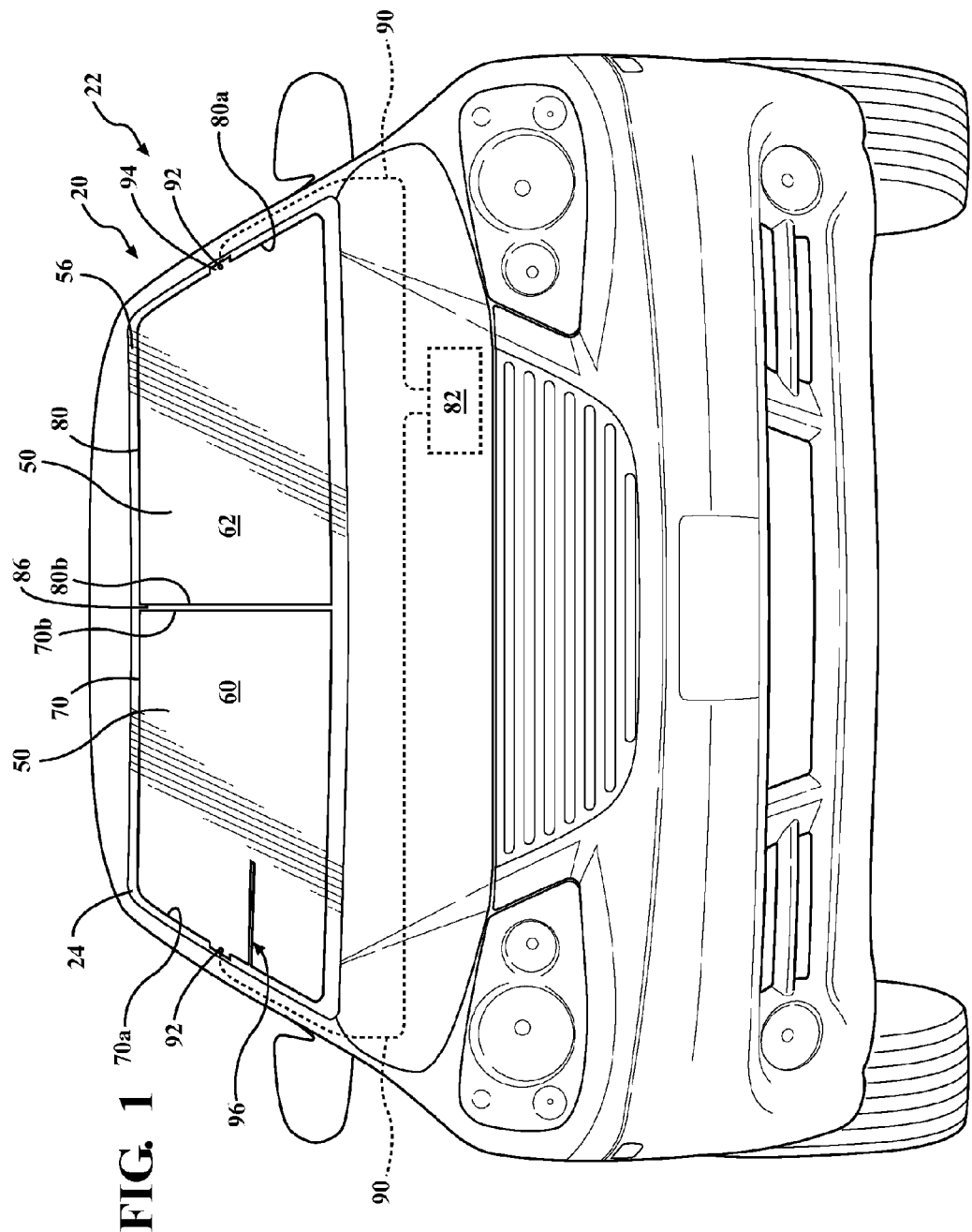
FIG. 1 is a perspective view of a vehicle having a window assembly with a transparent layer disposed on a substrate and defining a first and a second region which are connected to a diversity receiver, with the first region including a performance enhancing slit formed therein, according to one embodiment of the invention.

Referring to the Figures, wherein like numerals indicate corresponding parts throughout the several views, a window assembly is generally shown at 20. As shown in FIG. 1, the window assembly 20 is preferably for a vehicle 22. The window assembly 20 may be a front window (windshield) as illustrated in FIG. 1. Alternatively, the window assembly 20 may be a rear window (backlite), a roof window (sunroof), or any other window of the vehicle 22. Typically, the vehicle 22 defines an aperture and the window assembly 20 closes the aperture. The aperture is conventionally defined by a window frame of the vehicle 22.

The window assembly 20 includes a substrate 24 which is substantially transparent. As utilized herein, the term "substantially transparent" is defined generally as having a visible light transmittance of greater than 60 percent. In one embodiment, the visible light transmittance of the substrate 24 is greater than 75 percent. In yet another embodiment, the visible light transmittance of the substrate 24 is greater than 90 percent.

Figure 9:
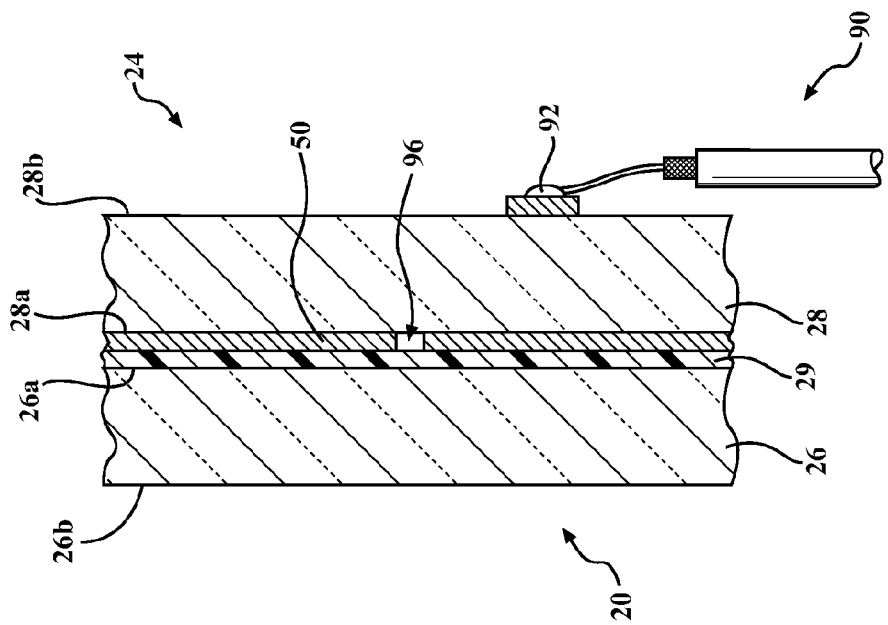
FIG. 9 is a cross-sectional partial view of the window assembly having the transparent layer disposed on an outer surface of an interior substrate and a feeding element abutting and in direct electrical connection with the transparent layer, according to one embodiment of the invention.
Figure 10:
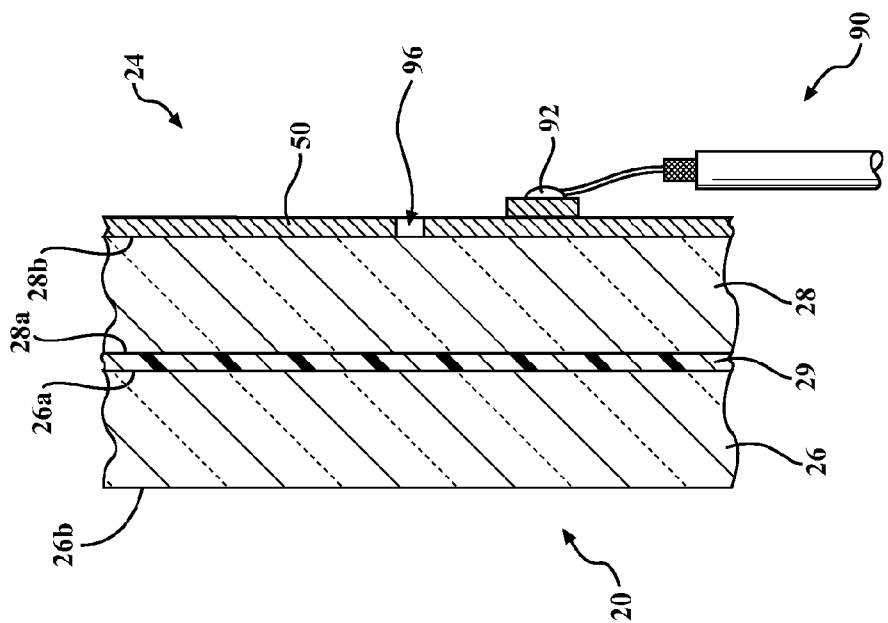
FIG. 10 is a cross-sectional partial view of the window assembly having the transparent layer disposed between the interior substrate and an exterior substrate and the feeding element spaced from and capacitively coupled to the transparent layer, according to another embodiment of the invention.

In one embodiment, the substrate 24 is a single, integrally formed piece. In another embodiment, as illustrated in FIGS. 9 and 10, the substrate 24 includes an exterior substrate 26 and an interior substrate 28 disposed adjacent the exterior substrate 26. The exterior substrate 26 is disposed parallel to and spaced from the interior substrate 28. In this embodiment, the exterior and interior substrates 26, 28 are joined together to form the substrate 24. Preferably, the exterior and interior substrates 26, 28 are panes of glass. The panes of glass are preferably automotive glass and, more specifically, soda-lime-silica glass. However, the exterior and interior substrates 26, 28 may be plastic, fiberglass, or other suitable electrically non-conductive and substantially transparent material.

Typically, the exterior and interior substrates 26, 28 are electrically non-conductive. As mentioned herein, the term "non-conductive" refers generally to a material, such as an insulator or dielectric, that when placed between conductors at different electric potentials, permits a negligible current to flow through the material. The exterior and interior substrates 26, 28 are also substantially transparent to light. However, the exterior and interior substrates 26, 28 may be colored or tinted.

The substrate 24 may include a plurality of surfaces. For example, as shown in FIGS. 9 and 10, each of the exterior and interior substrates 26, 28 has an inner surface 26a, 28a and an outer surface 26b, 28b. The outer surface 26b of the exterior substrate 26 typically faces an exterior of the vehicle 22. The outer surface 28b of the interior substrate 28 typically faces an interior of the vehicle 22. The inner surfaces 26a, 28a of the exterior and interior substrates 26, 28 typically face one another when the exterior and interior substrates 26, 28 are joined together to form the substrate 24.

As shown in FIGS. 2-8, the substrate 24 defines a perimeter 30. The perimeter 30 may be defined alternatively as a peripheral edge of the substrate 24. The perimeter 30 includes an upper perimeter edge 30a and an opposing lower perimeter edge 30b. The perimeter 30 generally includes opposing side perimeter edges 30c, 30d which are connected to the upper and lower perimeter edges 30a, 30b. As used herein, the term "upper" and "lower" are typically utilized to orient the perimeter 30 of the substrate 24 with respect to surface of the earth such that the upper perimeter edge 30a is higher in elevation from the surface of the earth than the lower perimeter edge 30b. However, the terms "upper" and "lower" are not intended to limit the orientation of the upper and lower perimeter edges 30a, 30b. As such, the upper and lower perimeter edges 30a, 30b may have alternative orientations without departing from the scope of the invention. Furthermore, the upper, lower, and/or side perimeter edges 30a, 30b, 30c, 30d may be curved or linear.

When utilized as the windshield of the vehicle 22, the perimeter 30 of the substrate 24 typically has a trapezoidal configuration, as shown in FIGS. 2-8. However, the perimeter 30 of the substrate 24 may have other shapes not specifically described herein.

As shown in FIGS. 2-7, an axis 40 extends vertically between the upper and lower perimeter edges 30a, 30b of the substrate 24. In such instances, the axis 40 is positioned generally at a horizontal center point of the substrate 24. The axis 40 generally divides the perimeter 30 of the substrate 24 into two substantially similar areas. In instances where the perimeter 30 of substrate 24 has a symmetrical configuration, the axis 40 may bisect the substrate 24 into congruent areas. In FIG. 8, the axis 40 extends horizontally between the upper and lower perimeter edges 30a, 30b. In this embodiment, the axis 40 is positioned generally at a vertical center point of the substrate 24.

As shown in FIGS. 1-10, the window assembly 20 includes a transparent layer 50. The transparent layer 50 is disposed on the surface of the substrate 24. In one embodiment, as shown in FIG. 9 the transparent layer 50 is disposed on the outer surface 28b of the interior substrate 28. In another embodiment, as shown in FIG. 10, the transparent layer 50 is disposed between the inner surface 26a of the exterior substrate 26 and the inner surface 28a of the interior substrate 28. In such instances, the transparent layer 50 is protected from direct contact with environmental factors which may damage the transparent layer 50.

Although not required, an interlayer 29 may be disposed between the inner surfaces 26a, 28a of the exterior and interior substrates 26, 28, as illustrated in FIGS. 9 and 10. Preferably, the interlayer 29 bonds the exterior and interior substrates 26, 28 and prevents the window assembly 20 from shattering upon impact. Furthermore, the interlayer 29 typically is substantially transparent to light and includes a polymer or thermoplastic resin, such as polyvinyl butyral (PVB). However, other suitable materials for implementing the interlayer 29 may be utilized. Conventionally, the interlayer 29 has a thickness of between 0.5 mm to 1 mm.

The interlayer 29 may be disposed adjacent the transparent layer 50. In one embodiment, as shown in FIG. 10, the interlayer 29 is disposed between the transparent layer 50 and the inner surface 26a of the exterior substrate 26. Alternatively, the transparent 50 may be disposed between the interlayer 29 and the inner surface 28a of the interior substrate 28. Preferably, the window assembly 20 includes the transparent layer 50 and interlayer 29 sandwiched between the exterior and interior substrates 26, 28 such that the interlayer 29 and the transparent layer 50 are abutting the inner surfaces 26a, 28a of the exterior and/or interior substrates 26, 28. Although not shown in the Figures, it is to be appreciated that the transparent layer 50 may be embedded within the interlayer 29 such that the transparent layer 50 is sandwiched between the interlayer 29 on both sides.

The transparent layer 50 is substantially transparent to light. Accordingly, a driver or occupant of the vehicle 22 may see through the substrate 24 having the transparent layer 50. The transparent layer 50 preferably reflects heat from sunlight penetrating the substrate 24. As such, the transparent layer 50 reduces transmission of infrared radiation through the substrate 24. The transparent layer 50 may further operate as a defogging or a defrosting element to provide heating capability to the substrate 24.

In one embodiment, the transparent layer 50 is a film. In another embodiment, the transparent layer 50 is a coating. The transparent layer 50 may be applied to the surface of the substrate 24 according to any suitable method, such as chemical vapor deposition, magnetron sputter vapor deposition, spray pyrolysis, and the like.

The transparent layer 50 includes a metal compound such that the transparent layer 50 is electrically conductive. As mentioned herein, the term "electrically conductive" refers generally to a material, such as a conductor, exhibiting low electrical resistivity for effectively allowing flow of electric current through the material. Preferably, the metal compound includes a metal oxide. However, the metal compound may also include a metal nitride, and the like. The metal oxide may include a tin oxide, such as indium tin oxide, or the like. However, the transparent layer 50 may include other metal oxides, including, but not limited to, silver oxide. The metal compound may also be doped with an additive, such as fluorine. Specifically, the additive may be included in the metal compound to optimize the light transmittance and electrical resistivity of the transparent layer 50. The transparent layer 50 may have any suitable electrical sheet resistance quantifying an ability of the transparent layer 50 to oppose flow of electrical current through the transparent layer 50. The sheet resistance may also be known as a surface resistance. In one example, the transparent layer 24 has a sheet resistance in a range between 0.5-20 Ω/square.

In one embodiment, the transparent layer 50 occupies at least a majority of the surface of the substrate 24. As used herein, majority is defined as greater than 50 percent of the surface area. Generally, the transparent layer 50 covers at least a majority of the surface for maximizing the reduction of transmission of infrared radiation through the substrate 24. In other embodiments, the transparent layer 50 may occupy a minority of the surface. Alternatively, the transparent layer 50 may occupy an entirety of the substrate 24 such that the transparent layer 50 extends to the perimeter 30 of the substrate 24. The transparent layer 50 may define a shape substantially similar to the perimeter 30 of the substrate 24. Alternatively, the transparent layer 50 may have any suitable shape.

As shown in FIGS. 1-8, an outer region 56 may be formed on the substrate 24 between the transparent layer 50 and the perimeter 30 of the substrate 24. The outer region 56 is devoid of the transparent layer 50 and is therefore, electrically non-conductive. The outer region 56 has a width defined as a distance between transparent layer 50 and the perimeter 30 of the substrate 24. Preferably, the width is greater than 0 mm and less than 200 mm.

A vehicle device, such as a mirror or rain sensor, may be attached or mounted to the substrate 24. Presence of the transparent layer 50 at a location where the vehicle device attaches to the substrate 24 may adversely affect performance of the vehicle device. Therefore, the transparent layer 50 may include an opening, typically near the upper perimeter 30a of the substrate 24, to accommodate attachment of the vehicle device on the substrate 24. In one embodiment, as illustrated in FIGS. 2-7, the opening opens into the outer region 56 such that the outer region 56 is expanded near the upper perimeter 30a of the substrate 24. The opening may have any suitable shape, such as U-shaped configuration, as shown in FIGS. 2-7. The axis 40 may bisect the opening. In other embodiments, the opening is surrounded by the transparent layer 50 such that the opening is isolated from and does not extend into the outer region 56. The opening may be defined in the vicinity of the axis 40. If the opening is required, the transparent layer 50 may be modified to the extent necessary to enable the present invention to function properly.

The transparent layer 50 defines a first region 60 and a second region 62. The first and second regions 60, 62 are substantially congruent to one another. Each of the first and second regions 60, 62 defines an area and a shape. As used herein, the term "substantially congruent" generally means that the first and second regions 60, 62 have substantially the same area and substantially the same shape. In one example, as illustrated in FIGS. 1-7, the first and second regions 60, 62 have identical areas and identical shapes such that the first and second regions 60, 62 are identically congruent. However, the first and second regions 60, 62 need only be substantially congruent. Accordingly, the term "substantially congruent" is further defined herein as the area of the first region 60 being no greater or less than 10% of the area of the second region 62, and the shape of the first region 60 being at least 90% geometrically similar to the shape of the second region 62. Geometric similarity may be assessed by scaling (proportionally enlarging or reducing), rotating, translating, and/or reflecting the first and/or second regions 60, 62 such that the shapes of the first and second regions 60, 62 are as geometrically congruent as possible. In one example, as shown in FIG. 8, the first region 60 and the second region 62 are not identically congruent, but instead are substantially congruent. Specifically, the area of the first region 60 is less than 10% of the area of the second region 62, and the shape of the first region 60 is at least 90% geometrically similar to the shape of the second region 62.

The first region 60 defines a first periphery 70 and the second region defines a second periphery 80. Each of the first and second peripheries 70, 80 includes an outer edge 70a, 80a and an inner edge 70b, 80b. For each of the first and second peripheries 70, 80, the outer edge 70a, 80a opposes the inner edge 70b, 80b. As used herein, the term "inner" is utilized to orient the first and second peripheries 70, 80 such that the inner edges 70b, 80b of the first and second peripheries 70, 80 are adjacent and face one another. In one embodiment, each of the first and second peripheries 70, 80 further includes a side edge 70c, 80c and an opposing side edge 70d, 80d that are connected to the outer edge 70a, 80a and inner edge 70b, 80b.

The first and second regions 60, 62 are each configured to operate as a diversity antenna element for transmitting and/or receiving a radio frequency signal. Each of the first and second regions 60, 62 may be configured to transmit and/or receive linearly or circularly polarized radio frequency signals. Specifically, the linearly polarized RF signals which the first and second regions 60, 62 may transit and/or receive include, but are not limited to AM, FM, RKE (remote keyless entry), or TV signals. The circularly polarized RF signals which the first and second regions 60, 62 may transmit and/or receive include, but are not limited to SDARS (satellite radio) or GPS signals. As shown in FIG. 1, a diversity receiver 82 may be provided that is configured to select an optimal one of the radio frequency signals received by the first and second regions.

The first and second peripheries 70, 80 may have any suitable shape without departing from the scope of the invention. For instance, as shown predominately throughout the Figures, the first and second peripheries 70, 80 have a quadrilateral configuration. However, the first and second peripheries 70, 80 may have other configurations, including, but not limited to a triangular or semi-circular configuration.

The first and second peripheries 70, 80 may be oriented with respect to the perimeter 30 of the substrate 24 according to various different configurations. As shown in one example in FIGS. 1-7, the inner edges 70b, 80b of each of the first and second peripheries 70, 80 are disposed substantially orthogonal to the upper and lower perimeter edges 30a, 30b of the substrate 24. In another example, as shown in FIG. 8, the inner edge 70b, 80b of each of the first and second peripheries 70, 80 is disposed substantially parallel to the upper and lower perimeter edges 30a, 30b of the substrate 24.

Figure 2:
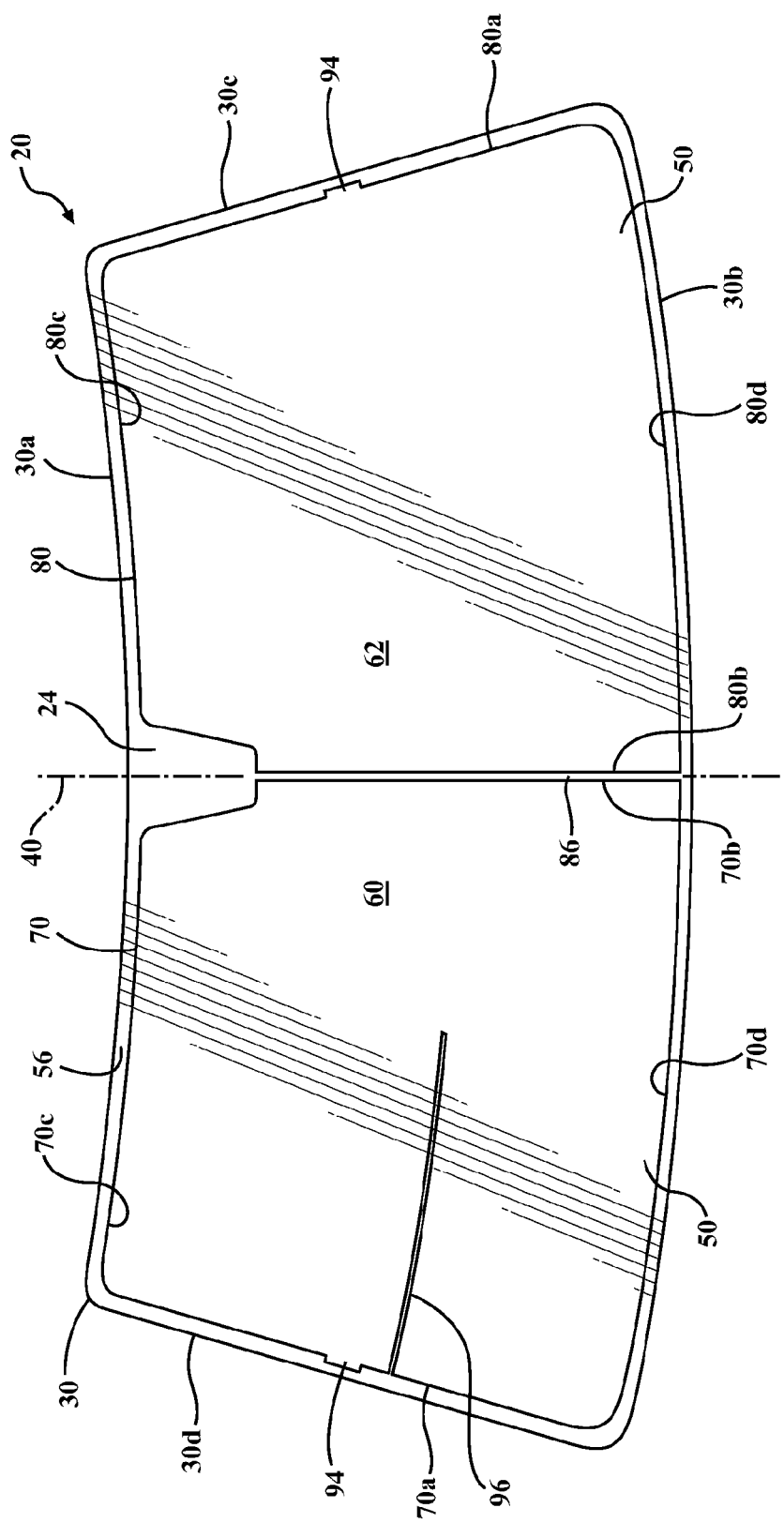
FIG. 2 is a plan view of the window assembly having the first region including the slit formed therein, according to another embodiment of the invention.
Figure 3:
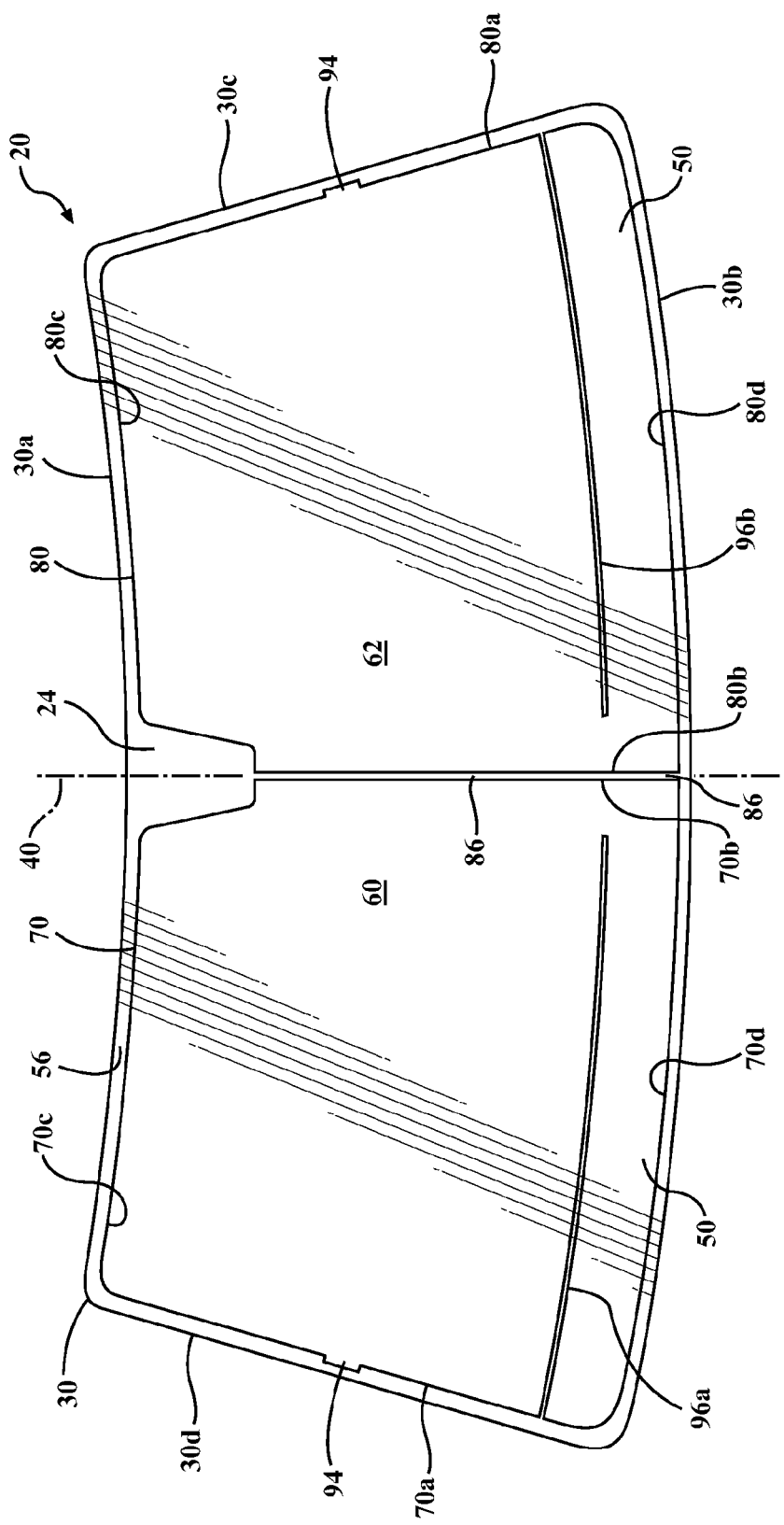
FIG. 3 is a plan view of the window assembly having the first and second regions each defining the slit, with the slits disposed symmetrically with respect to an axis extending vertically across the substrate, according to another embodiment of the invention.

In one embodiment, the inner edge 70b of the first periphery 70 and the inner edge 80b of the second periphery 80 each have a linear configuration. The inner edges 70b, 80b extend substantially parallel to one another. As shown in FIGS. 2 and 3, the inner edge 70b of the first periphery 70 and the inner edge 80b of the second periphery 80 may be spaced equally from the axis 40. In other words, the axis 40 is equidistant from the inner edges 70b, 80b. Preferably, the inner edges 70b, 80b are spaced apart by less than 10 mm. In other embodiments, the inner edges 70b, 80b may have nonlinear configurations such that the inner edges 70b, 80b do not extend parallel to one another.

The first and second regions 60, 62 are spaced from one another by a section cut 86. The section cut 86 is devoid of the transparent layer 50 and is electrically non-conductive. Generally, the section cut 86 opens into the outer region 56 such that the section cut 86 and the outer region 56 form a common electrically non-conductive region. The section cut 86 is defined by the inner edge 70b, 80b of each of the first and second peripheries 70, 80. In the embodiments shown in FIGS. 1-8, the section cut 86 has a linear configuration as defined by the adjacent first and second regions 60, 62. More specifically, the linear configuration of the section cut 86 is defined by the adjacent inner edges 70b, 80b of the first and second peripheries 70, 80. As mentioned above, the inner edges 70b, 80b are preferably spaced by less than 10 mm. As such, the section cut 86 is preferably less than 10 mm wide. In other embodiments, the section cut 86 may have a non-linear configuration, such as a curvilinear configuration, and the like. The section cut 86 may be formed on substrate 24 according to any suitable technique known in the art. For instance, removal or deletion of the region of transparent layer 50 defining the section cut 86 may be accomplished using masking, lasers, abrasive tools, chemical removal, mechanical cutting tools, and the like.

As shown in FIG. 1, the window assembly 20 includes a feeding arrangement 90 that is coupled to the transparent layer 50, and more specifically the first and second regions 60, 62. The feeding arrangement 90 energizes the first and second regions 60, 62 such that the first and second regions 60, 62 transmit and/or receive radio frequency signals. The first and second regions 60, 62 are connected to the diversity receiver 82 through the feeding arrangement 90. With respect to the feeding arrangement 90, the term "energize" is understood to describe an electrical relationship between the feeding arrangement 90 and the first and second regions 60, 62 whereby the feeding arrangement 90 excites the first and second regions 60, 62 for transmission of radio waves, and is electrically coupled to the first and second regions 60, 62 for reception of impinging radio waves.

The feeding arrangement 90 may include any suitable configuration for energizing the first and second regions 60, 62. As shown in FIGS. 9 and 10, the feeding arrangement 90 typically includes at least one feeding element 92. In one embodiment, as shown in FIG. 1, the feeding arrangement 90 includes two separate feeding elements 92 each of which is separately coupled to one of the first and second regions 60, 62. In another embodiment, the feeding arrangement 90 includes one feeding element 90 that is coupled to both the first and second regions 60, 62. The feeding element 92 may include any suitable material for energizing the first and second regions 60, 62. Additionally, the feeding element 92 may be of any suitable configuration, including, but not limited to a feeding strip, a feeding wire, or a combination of both.

The feeding element 92 may be disposed on any surface of the substrate 24. Furthermore, the feeding element 92 may be disposed coplanar or non-coplanar with respect to the transparent layer 50. As shown predominately throughout the Figures, each of the first and second regions 60, 62 may include a tab 94 of transparent layer 50 which integrally extends from the respective first and second regions 60, 62. The tabs 94 extend beyond the respective first and second peripheries 70, 80 into the outer region 56. The tabs 94 enable the feeding element 92 to be readily connected to the first and second regions 60, 62 without disruption of the field of view through the substrate 24.

According to one embodiment, as shown in FIG. 9, the feeding element 92 abuts and is in direct electrical connection with the transparent layer 50. Here, the feeding element 92 may be directly wired or soldered to the transparent layer 50. The feeding element 92 passes electrical current to the transparent layer 50 directly through an electrically conductive material, such as a feeding strip or wire, physically attached to the transparent layer 50. The feeding element 92 may abut and be in direct electrical connection while the transparent layer 50 is disposed on any layer of the substrate 24. Alternatively, as shown in FIG. 10, the feeding element 92 may be spaced from and capacitively coupled to the transparent layer 50. In such instances, the feeding element 92 induces current to the transparent layer 50 through the air or a dielectric material, such as the exterior or interior substrates 26, 28. In such embodiments, the feeding element 92 is generally neither directly wired nor in direct contact with the transparent layer 50. The feeding element 92 is disposed generally non-coplanar with the transparent layer 50. The first and second regions 60, 62 may be energized by the feeding arrangement 90 according to other configurations not specifically recited herein.

As illustrated in FIGS. 1 and 2, at least one of the first and second regions 60, 62 defines a performance enhancing slit 96 that is devoid of the transparent layer 50. The slit 96 is configured to operate as at least one of an impedance matching element and a radiation pattern altering element. In one embodiment, the slit 96 is configured to operate only as an impedance matching element. In another embodiment, the slit 96 is configured to operate only as a radiation pattern altering element. Of course, the slit 96 may be configured to operate as both an impedance matching element and a radiation pattern altering element at the same time.

The slit 96 may operate as an impedance matching element by matching impedance of the first and/or second regions 60, 62 with impedance of a cable. The cable, for example, may be a coaxial cable that is utilized in energizing the first and/or second regions 60, 62, as will be described below.

The slit 96 may operate as a radiation pattern altering element by altering directions by which radio signals are transmitted and/or received from the first and/or second regions 60, 62. More specifically, the slit 96 may alter directions by which radio signal are transmitted and/or received such that the radiation pattern(s) of the first and/or second regions 60, 62 exhibit greater omni-directionality. The slit 96 enables greater control over radiation patterns and impedance characteristics of the first and second regions 60, 62 operating as antenna elements. The slit 96 helps to counteract electromagnetic interference to ensure optimal efficiency. As such, the slit 96 enhances the performance of the first and/or second regions 60, 62. As mentioned above, the transparent layer 50, and more specifically the first and/or second regions 60, 62, may optionally further operate as defogging or defrosting elements. In such instances, the first region 60, the second regions 62, and/or the slit 96 may be modified to accommodate the optional defogging or defrosting capability of the transparent layer 50, without departing from the scope of this invention.

In one embodiment, the slit 96 has a linear configuration as defined by the transparent layer 50 of one of the first and second regions 60, 62. Preferably, the transparent layer 50 defining the linear configuration of the slit 96 is uniformly spaced by less than 2 mm. In other embodiments, the slit 96 has a non-linear configuration, such as a curvilinear configuration, a zigzag configuration, and the like. The slit 96 may extend according to various suitable lengths. In one example, the slit 96 may have a length greater than 200 mm. The slit 96 may be formed on substrate 24 according to any suitable technique known in the art. For instance, removal or deletion of selected portions of the transparent layer 50 corresponding to the slit 96 may be accomplished using masking, lasers, abrasive tools, chemical removal, mechanical cutting tools, and the like.

Figure 7:
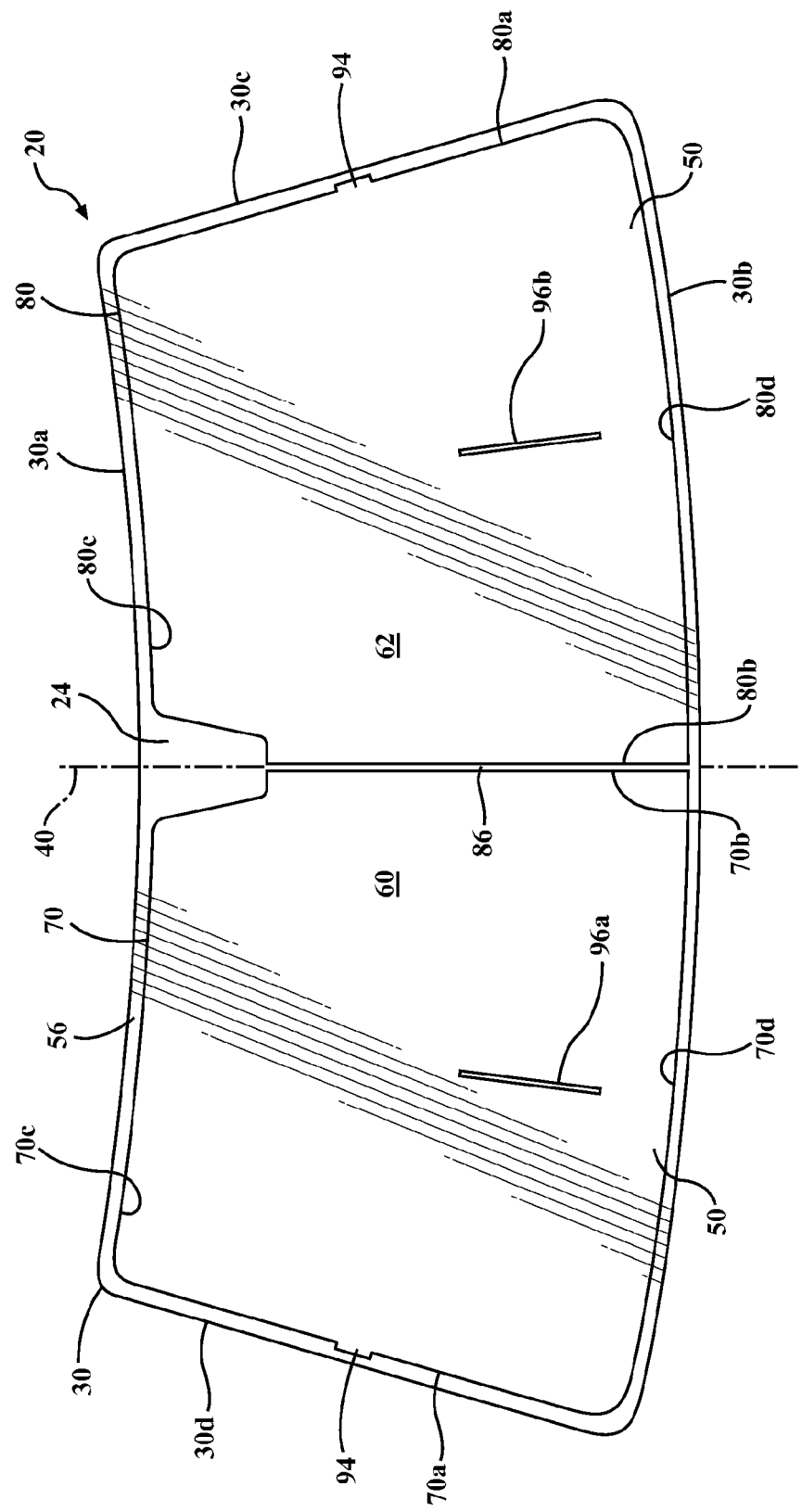
FIG. 7 is a plan view of the window assembly having the first and second regions separated by the linear section cut, with the slits disposed symmetrically with respect to the linear section cut and defined within the peripheries of the first and second regions such that the slits are surrounded by transparent layer, according to another embodiment of the invention.
Figure 8:
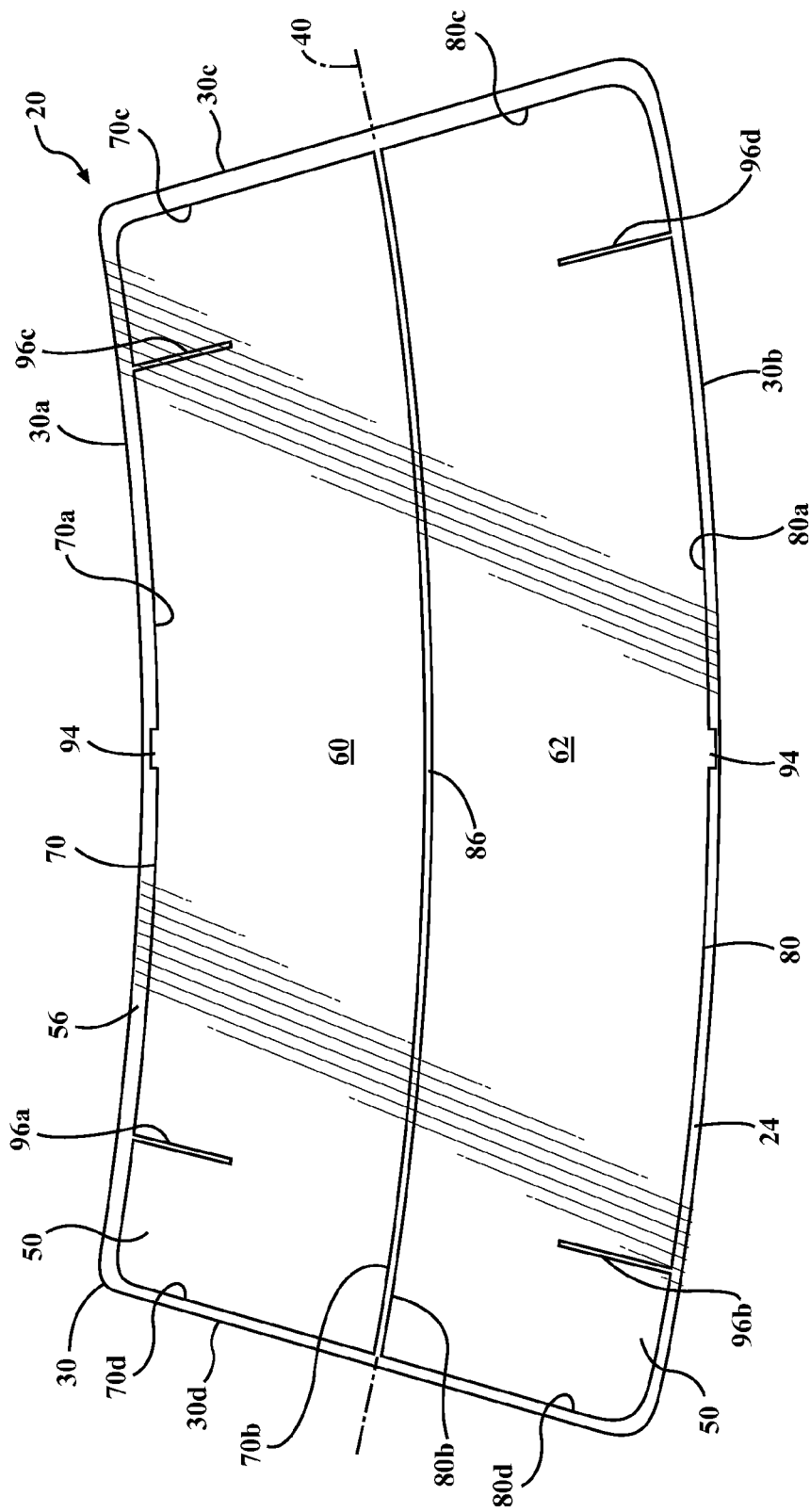
FIG. 8 is a plan view of the window assembly having the first and second regions each defining two slits disposed symmetrically with respect to an axis extending horizontally across the substrate, according to another embodiment of the invention.

According to one embodiment, as shown in FIGS. 3 and 7, the first region 60 defines a first slit 96a and the second region 62 defines a second slit 96b. The first and second slits 96a, 96b may be positioned symmetrically in relation to one another with respect to the axis 40. As shown in FIG. 3, the first and second slits 96a, 96b are oriented substantially orthogonal to the axis 40. Alternatively, as shown in FIG. 7, the first and second slits 96a, 96b are oriented substantially parallel to the axis 40.

According to another embodiment, the first and second slits 96a, 96b may be positioned symmetrically in relation to one another with respect to the linear configuration of the section cut 86. In other words, the first and second slits 96a, 96b may be oriented with respect to first and second peripheries 70, 80 irrespective of the axis 40 or the perimeter 30 of the substrate 24. Of course, the first and second slits 96a, 96b may be positioned symmetrically with respect to the axis 40, the linear configuration of the section cut 86, or both.

In one embodiment, as shown in FIGS. 1-5, and 8, the slit 96 extends into one of the first and second regions 60, 62 from the respective first and second periphery 70, 80. As shown in FIG. 3, the first slit 96a extends into the first region 60 from the first periphery 70 and the second slit 96b extends into the second region 62 from the second periphery 80. Here, the first and second slits 96a, 96b generally open into the outer region 56. In one embodiment, the first slit 96a may extend into the first region 60 from no more than one location on the first periphery 70. Similarly, the second slit 96b extends into the second region 62 from no more than one location on the second periphery 80. In other words, in such instances, the first and second slits 96a, 96b do not extend across the respective first and second regions 60, 62 to the extent that the first and second slits 96a, 96b fully divide each of the respective first and second regions 60, 62 into smaller regions.

Figure 6:
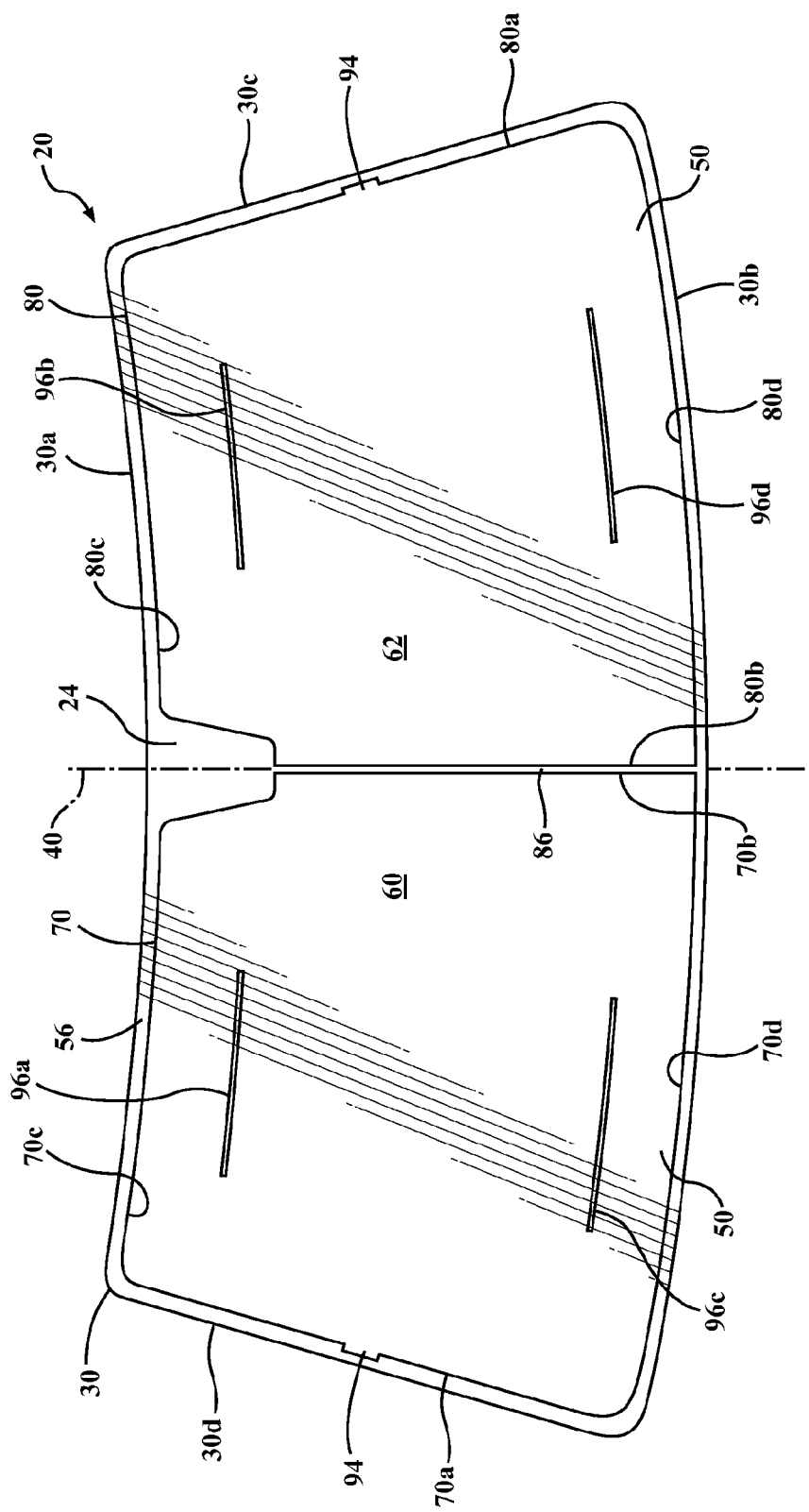
FIG. 6 is a plan view of the window assembly having the first and second regions separated by a linear section cut, with the first and second regions each defining two slits that are disposed symmetrically with respect to the linear section cut, according to another embodiment of the invention.

In another embodiment, as shown in FIGS. 6 and 7, the slit 96 is defined within one of the first and second peripheries 70, 80 such that the slit 96 is surrounded by the transparent layer 50. For instance, in FIG. 7, the first slit 96a is defined within the first periphery 70 such that the first slit 96a is surrounded by the transparent layer 50 of the first region 60. Similarly, the second slit 96b is defined within the second periphery 80 such that the second slit 96b is surrounded by the transparent layer 50 of the second region 62. Here, the first and second slits 96a, 96b are spaced from and isolated from the outer region 56 such that the first and second slits 96a, 96b do not open into the outer region 56.

Figure 4:
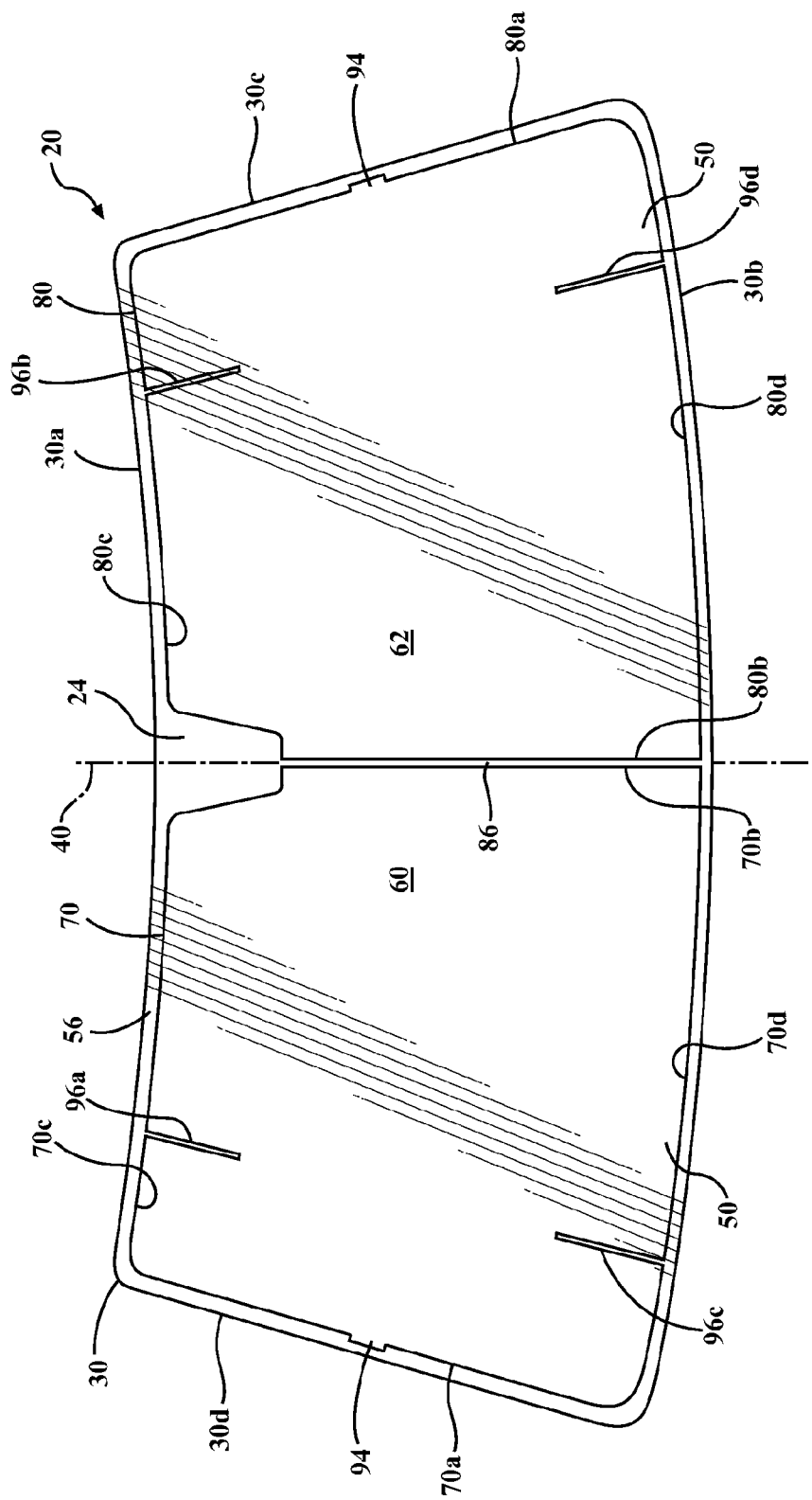
FIG. 4 is a plan view of the window assembly having the first and second regions each defining two slits, with the slits being oriented parallel to the axis extending vertically across the substrate according to another embodiment of the invention.

In yet another embodiment, as shown in FIGS. 2-3, and 5-6, and 8, the first slit 96a extends substantially parallel to at least one of the side edge 70c or the opposing side edge 70d of the first periphery 70. Similarly, the second slit 96b extends substantially parallel to at least one of the side edge 80c and the opposing side edge 80d of the second periphery 80. Alternatively, as shown in FIGS. 4 and 7, the first slit 96a extends substantially parallel to the one of the outer and inner edges 70a, 70b of the first periphery 70. Similarly, the second slit 96b extends substantially parallel to one of the outer and inner edges 80a, 80b of the second periphery 80.

Figure 11A:
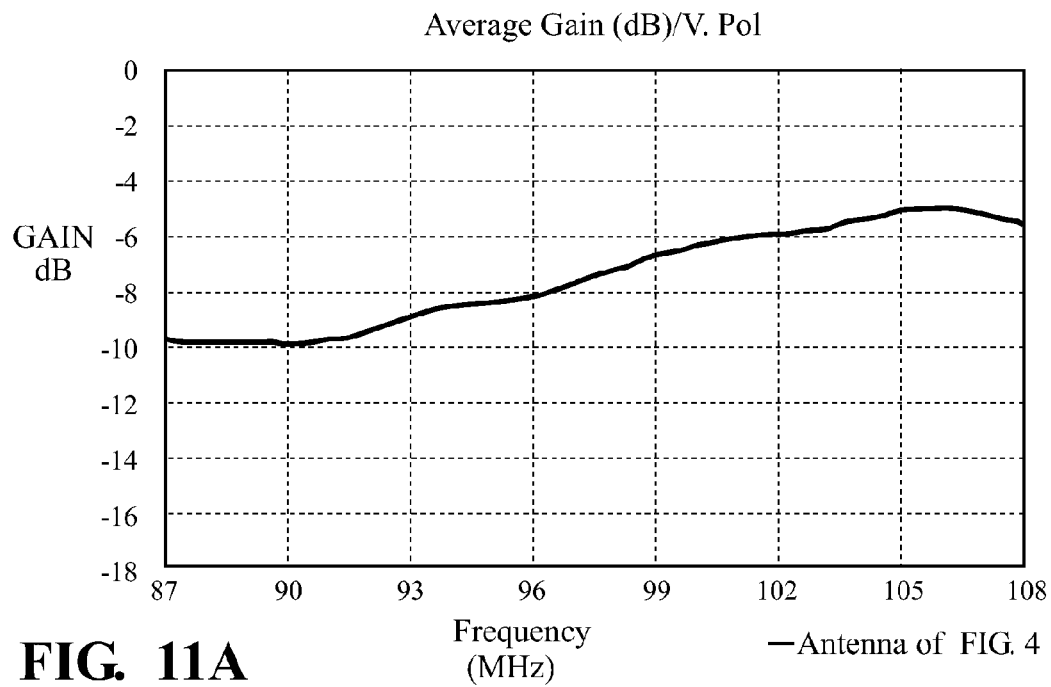
FIG. 11A is a graph illustrating the frequency-gain characteristics of the window assembly of FIG. 4.
Figure 11B:
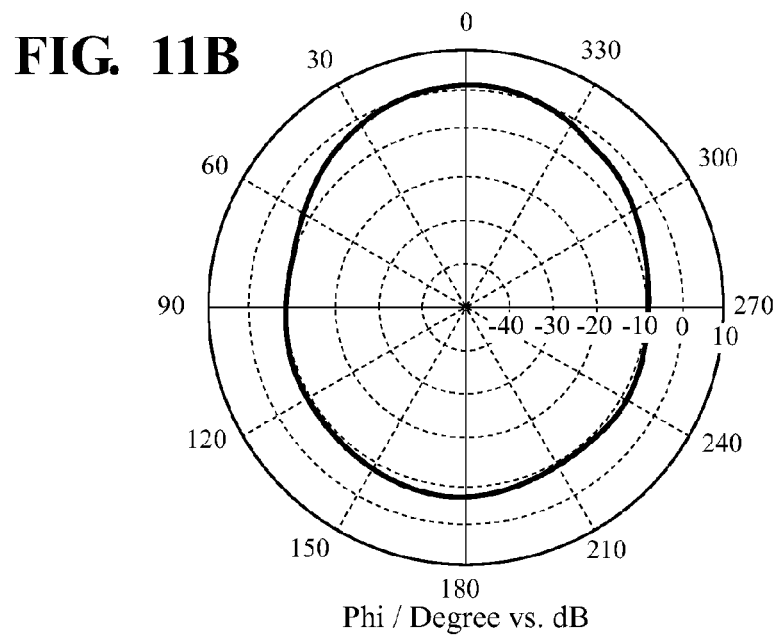
FIG. 11B is a graph illustrating the radiation pattern characteristics of the window assembly of FIG. 4.

The first and second regions 60, 62 may include more than one slit 96. As shown in FIGS. 4-6 and 8, the first and second regions 60, 62 each include a pair of slits 96. In the embodiment of FIG. 4, the first region 60 defines the first slit 96a and a third slit 96c. The second region 62 defines the second slit 96b and a fourth slit 96d. Each of the first and third slits 96a, 96c extends into the first region 60 from no more than one location on the first periphery 70. Each of the second and fourth slits 96b, 96d extends into the second region 62 from no more than one location on the second periphery 80. The first and third slits 96a, 96c are positioned symmetrically in relation to the second and fourth slits 96b, 96d with respect to the axis 40. Each of the slits 96a, 96b, 96c, and 96d are oriented substantially parallel to the axis 40. In this embodiment, the first slit 96a extends from one of the side edges 70c of the first periphery 70. The second slit 96b extends from one of the side edges 80c of the second periphery 80. The third slit 96c extends from the opposing side edge 70d of the first periphery 70. The fourth slit 96d extends from the opposing side edge 80d of the second periphery 80. As such, the first and second slits 96a, 96b extend from symmetrically corresponding sides 70c, 80c of the respective first and second peripheries 70, 80. Similarly, the third and fourth slits 96c, 96d extend from symmetrically corresponding sides 70d, 80d of the respective first and second peripheries 70, 80. FIGS. 11A and 11B illustrate respectively the advantageous frequency-gain and radiation pattern characteristics of the window assembly 20 embodiment illustrated in FIG. 4. Although the frequency-gain and radiation pattern characteristics illustrated in FIGS. 11A and 11B are identified as resulting from the window assembly 20 illustrated in FIG. 4, the window assembly 20 of FIG. 4 is not necessarily illustrated to scale. Thus, although the specific frequency-gain and radiation pattern characteristics illustrated in FIGS. 11A and 11B may substantially correspond to the window assembly 20 illustrated in FIG. 4, the specific frequency-gain and radiation pattern characteristics illustrated in FIGS. 11A and 11B may differ by some degree from actual test results.

Figure 5:
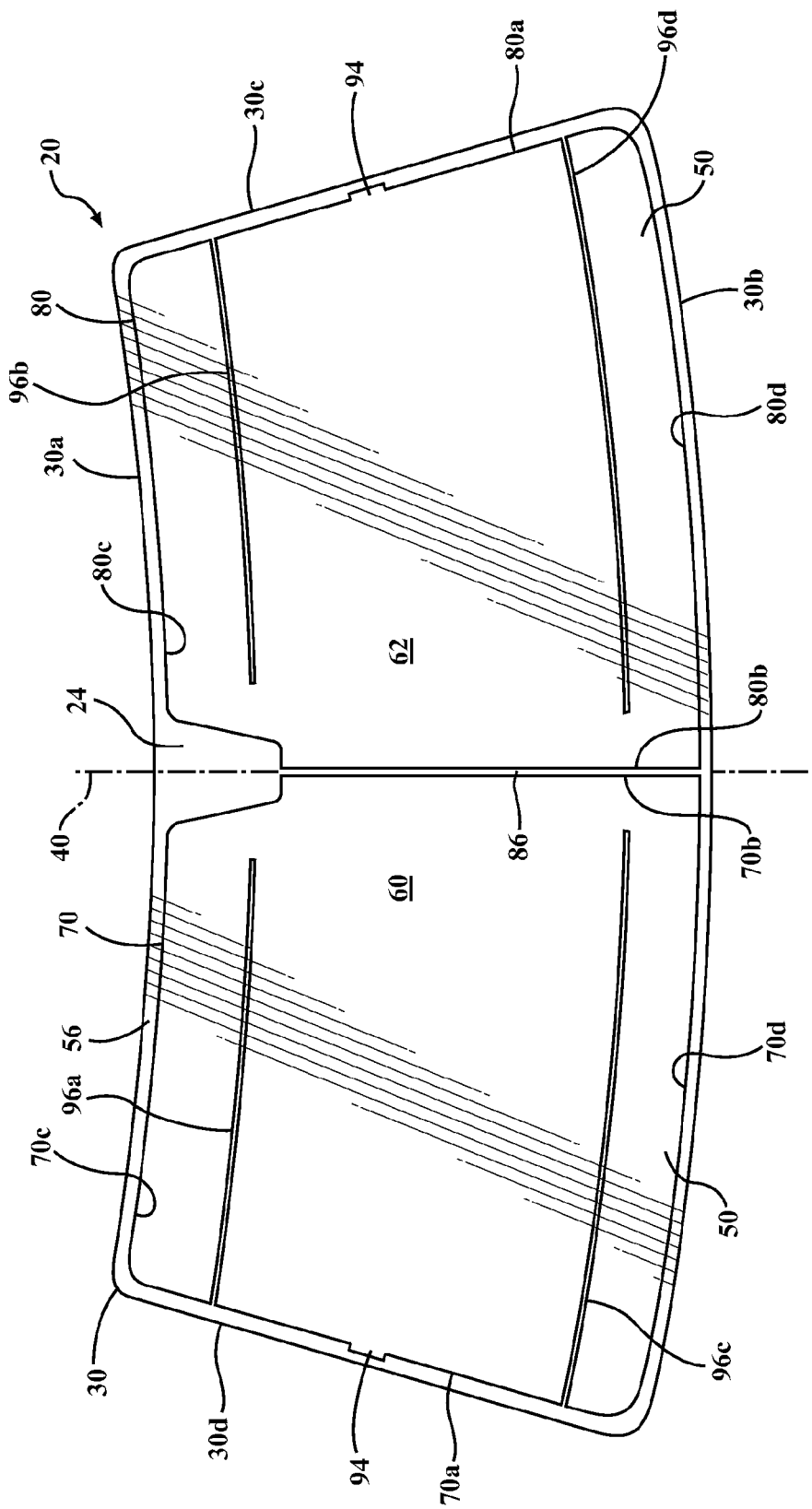
FIG. 5 is a plan view of the window assembly having the first and second regions each defining two slits, with the slits being oriented orthogonal to the axis extending vertically across the substrate, and with each slit extending from a periphery of one of the first and second regions, according to yet another embodiment of the invention.
Figure 12A:
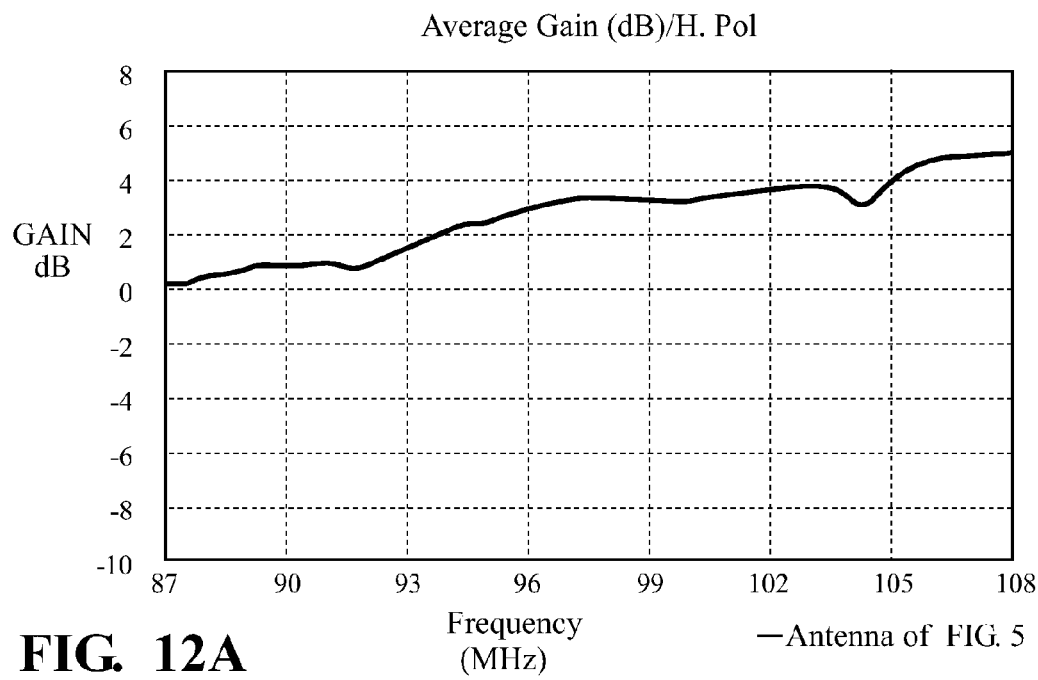
FIG. 12A is a graph illustrating the frequency-gain characteristics of the window assembly of FIG. 5.
Figure 12B:
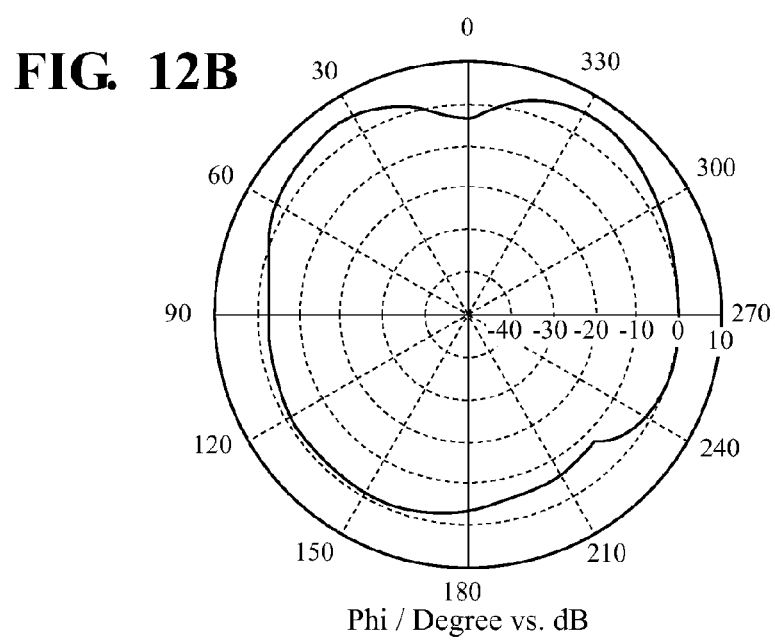
FIG. 12B is a graph illustrating the radiation pattern characteristics of the window assembly of FIG. 5.

In another embodiment, as shown in FIG. 5, the first region 60 defines the first slit 96a and the third slit 96c and the second region 62 defines the second slit 96b and the fourth slit 96d. Each of the first and third slits 96a, 96c extends into the first region 60 from no more than one location on the first periphery 70. Each of the second and fourth slits 96b, 96d extends into the second region 62 from no more than one location on the second periphery 80. The first and third slits 96a, 96c are positioned symmetrically in relation to the second and fourth slits 96b, 96d with respect to the axis 40. Each of the slits 96a, 96b, 96c, and 96d are oriented substantially orthogonal to the axis 40. In this embodiment, the first slit 96a extends from the outer edge 70a of the first periphery 70 and is disposed closer to one of the side edges 70c of the first periphery 70 than the opposing side edge 70d of the first periphery 70. The second slit 96b extends from the outer edge 80a of the second periphery 80 and is disposed closer to one of the side edges 80c of the second periphery 80 than the opposing side edge 80d of the second periphery 80. The third slit 96c extends from the outer edge 70a of the first periphery 70 and is disposed closer to the opposing side edge 70d of the first periphery 70 than the side edge 70c of the first periphery 70. The fourth slit 96d extends from the outer edge 80a of the second periphery 80 and is disposed closer to the opposing side edge 80d of the second periphery 80 than the side edge 80c of the second periphery 80. As such, the first and second slits 96a, 96b are disposed closer to symmetrically corresponding side edges 70c, 80c of the respective first and second peripheries 70, 80. Similarly, the third and fourth slits 96c, 96d are disposed closer to symmetrically corresponding opposing side edges 70d, 80d of the respective first and second peripheries 70, 80. FIGS. 12A and 12B illustrate respectively the advantageous frequency-gain and radiation pattern characteristics of the window assembly 20 embodiment illustrated in FIG. 5. Although the frequency-gain and radiation pattern characteristics illustrated in FIGS. 12A and 12B are identified as resulting from the window assembly 20 illustrated in FIG. 5, the window assembly 20 of FIG. 5 is not necessarily illustrated to scale. Thus, although the specific frequency-gain and radiation pattern characteristics illustrated in FIGS. 12A and 12B may substantially correspond to the window assembly 20 illustrated in FIG. 5, the specific frequency-gain and radiation pattern characteristics illustrated in FIGS. 12A and 12B may differ by some degree from actual test results.

As discussed above, any one of the first, second, third, or fourth slits 96a, 96b, 96c, 96d may be configured to operate as at least one of an impedance matching element and a radiation pattern altering element. Thus, as an example, the first and second slits 96a, 96b may be configured to operate as impedance matching elements while the third and fourth slits 96c, 96d are configured to operate as radiation pattern altering elements.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A window assembly for a vehicle, said window assembly comprising:
   a substrate that is substantially transparent and has a surface and a perimeter;
   a transparent layer that is disposed on said surface and comprises a metal compound such that said transparent layer is electrically conductive;
   said transparent layer defining a first region having a first periphery and a second region having a second periphery, each of said first and second peripheries including an outer edge and opposing inner edge, and one side edge and an opposing side edge, said first and second regions being substantially congruent to one another;
   an outer region being electrically non-conductive and formed on said substrate between said perimeter of said substrate and each of said first and second peripheries;
   a section cut that is devoid of said transparent layer and defined between said inner edge of each of said first and second peripheries and with said section cut being defined from a first end to an opposing second end and with said second cut opening into said outer region at each of said first and second ends such that said section cut separates said first and second regions from one another; and
   a feeding arrangement coupled to said first and second regions and being configured to energize said first and second regions;
   wherein said first region defines a first performance enhancing slit that is devoid of said transparent layer and extending into said first region from said first periphery; and
   wherein said second region defines a second performance enhancing slit that is devoid of said transparent layer and extending into said second region from said second periphery.

2. The window assembly of claim 1 wherein said inner edge of said first periphery and said inner edge of said second periphery each have a linear configuration and extend substantially parallel to one another.

3. The window assembly of claim 1 wherein said perimeter of said substrate includes opposing upper and lower perimeter edges, and opposing side perimeter edges, wherein said inner edge of each of said first and second peripheries is disposed substantially orthogonal to said upper and lower perimeter edges.

4. The window assembly of claim 3 wherein an axis extends between said upper and lower perimeter edges of said substrate and divides said perimeter of said substrate into two substantially similar areas, and wherein said inner edge of said first periphery and said inner edge of said second periphery are equally spaced from said axis.

5. The window assembly of claim 4 wherein said first region defines a first slit and said second region defines a second slit, wherein said first and second slits are positioned symmetrically in relation to one another with respect to said axis.

6. The window assembly of claim 5 wherein said first region further defines a third slit, and said second region further defines a fourth slit, each of said first and third slits extend into said first region from no more than one location on said first periphery, each of said second and fourth slits extend into said second region from no more than one location on said second periphery, said first and third slits are positioned symmetrically in relation to said second and fourth slits with respect to said axis, and wherein each of said slits are oriented substantially parallel to said axis, wherein;
    said first slit extends from one of said side edges of said first periphery;
    said second slit extends from one of said side edges of said second periphery;
    said third slit extends from said opposing side edge of said first periphery; and
    said fourth slit extends from said opposing side edge of said second periphery.

7. The window assembly of claim 5 wherein said first region further defines a third slit, and said second region further defines a fourth slit, each of said first and third slits extend into said first region from no more than one location on said first periphery, each of said second and fourth slits extend into said second region from no more than one location on said second periphery, said first and third slits are positioned symmetrically in relation to said second and fourth slits with respect to said axis, and wherein each of said slits are oriented substantially orthogonal to said axis, wherein;
    said first slit extends from said outer edge of said first periphery and is disposed closer to one of said side edges of said first periphery than said opposing side edge of said first periphery;
    said second slit extends from said outer edge of said second periphery and is disposed closer to one of said side edges of said second periphery than said opposing side edge of said second periphery;
    said third slit extends from said outer edge of said first periphery and is disposed closer to said opposing side edge of said first periphery than said side edge of said first periphery; and
    said fourth slit extends from said outer edge of said second periphery and is disposed closer to said opposing side edge of said second periphery than said side edge of said second periphery.

8. The window assembly of claim 1 wherein said first slit extends into said first region from no more than one location on said first periphery, and wherein said second slit extends into said second region from no more than one location on said second periphery.

9. The window assembly of claim 1 wherein said first slit extends substantially parallel to at least one of said side edges of said first periphery, and wherein said second slit extends substantially parallel to at least one of said side edges of said second periphery.

10. The window assembly of claim 1 wherein said first slit extends substantially parallel to one of said outer and inner edges of first said periphery, and wherein said second slit extends substantially parallel to one of said outer and inner edges of said second periphery.

11. The window assembly of claim 1 wherein said section cut has a linear configuration as defined by said first and second peripheries, wherein said first and second slits are positioned symmetrically in relation to one another with respect to said linear configuration of said section cut.

12. The window assembly of claim 1 wherein said substrate comprises an exterior substrate having an inner surface and an outer surface and an interior substrate disposed adjacent said exterior substrate having an inner surface and an outer surface and wherein said transparent layer is disposed between said inner surface of said interior substrate and said inner surface of said exterior substrate.

13. The window assembly of claim 1 wherein said first and second regions are each configured to receive a radio frequency signal and to collectively operate in diversity such that an optimal one of said radio frequency signals received by said first and second regions can be selected.

14. The window assembly of claim 1 wherein said first and second slits are each configured to operate as at least one of an impedance matching element and a radiation pattern altering element.

15. The window assembly of claim 1 wherein said first slit has a linear configuration as defined by said transparent layer of said first region and wherein said second slit has a linear configuration as defined by said transparent layer of said second region and wherein said transparent layer defining said linear configuration of each of said first and second slits is uniformly spaced by less than 2 mm.

16. The window assembly of claim 1 wherein said first and second regions are electrically disconnected from one another on said substrate.

17. The window assembly of claim 1 wherein said transparent layer occupies at least a majority of said surface of said substrate.

18. The window assembly of claim 1 wherein said first and second regions include a tab of transparent layer integrally extending from the respective first and second region and with the tab extending into said outer region to enable said feeding arrangement to couple to said first and second regions in said outer region and without disrupting a field of view through said substrate.

19. A window assembly for a vehicle, said window assembly comprising:
    a substrate that is substantially transparent and has a surface and a perimeter;
    a transparent layer that is disposed on said surface and comprises a metal compound such that said transparent layer is electrically conductive;
    said transparent layer defining a first region having a first periphery and a second region having a second periphery, each of said first and second peripheries including an outer edge and opposing inner edge, and one side edge and an opposing side edge, said first and second regions being substantially congruent to one another;
    an outer region being electrically non-conductive and formed on said substrate between said perimeter of said substrate and each of said first and second peripheries;
    a section cut that is devoid of said transparent layer and defined between said inner edge of each of said first and second peripheries and with said section cut being defined from a first end to an opposing second end and with said second cut opening into said outer region at each of said first and second ends such that said section cut separates said first and second regions from one another; and
    a feeding arrangement coupled to said first and second regions and being configured to energize said first and second regions;
    wherein said first region defines a first performance enhancing slit that is devoid of said transparent layer and extending into said first region from no more than one location on said first periphery; and
    wherein said second region defines a second performance enhancing slit that is devoid of said transparent layer and extending into said second region from no more than one location on said second periphery.

20. The window assembly of claim 19 wherein said inner edge of said first periphery and said inner edge of said second periphery each have a linear configuration and extend substantially parallel to one another.

21. The window assembly of claim 19 wherein said first and second regions are electrically disconnected from one another on said substrate.

22. The window assembly of claim 19 wherein said transparent layer occupies at least a majority of said surface of said substrate.

23. A window assembly for a vehicle, said window assembly comprising:
   a substrate that is substantially transparent and has a surface and a perimeter;
   a transparent layer that is disposed on said surface and comprises a metal compound such that said transparent layer is electrically conductive;
   said transparent layer defining a first region having a first periphery and a second region having a second periphery, said first and second regions being substantially congruent to one another;
   an outer region being electrically non-conductive and formed on said substrate between said perimeter of said substrate and each of said first and second peripheries;
   a section cut that is devoid of said transparent layer and defined between first and second peripheries and with said section cut being defined from a first end to an opposing second end and with said second cut opening into said outer region at each of said first and second ends such that said section cut separates said first and second regions from one another; and
   a feeding arrangement coupled to said first and second regions and being configured to energize said first and second regions;
   wherein at least one of said first and second regions defines a performance enhancing slit that is devoid of said transparent layer; and
   wherein said first and second regions are each configured to receive a radio frequency signal and to collectively operate in diversity such that an optimal one of said radio frequency signals received by said first and second regions can be selected.

24. The window assembly of claim 23 wherein each of said first and second peripheries include an outer edge and opposing inner edge, and one side edge and an opposing side edge, wherein said section cut is further defined by said inner edge of each of said first and second peripheries, and wherein said inner edge of said first periphery and said inner edge of said second periphery each have a linear configuration and extend substantially parallel to one another.

25. The window assembly of claim 23 wherein said first and second regions are electrically disconnected from one another on said substrate.

26. The window assembly of claim 23 wherein said transparent layer occupies at least a majority of said surface of said substrate.

27. A window assembly for a vehicle, said window assembly comprising:
   a substrate that is substantially transparent and has a surface and a perimeter;
   a transparent layer that is disposed on said surface and comprises a metal compound such that said transparent layer is electrically conductive;
   said transparent layer defining a first region having a first periphery and a second region having a second periphery, said first and second regions being substantially congruent to one another;
   an outer region being electrically non-conductive and formed on said substrate between said perimeter of said substrate and each of said first and second peripheries;
   a section cut that is devoid of said transparent layer and defined between first and second peripheries and with said section cut being defined from a first end to an opposing second end and with said second cut opening into said outer region at each of said first and second ends such that said section cut separates said first and second regions from one another; and
   a feeding arrangement coupled to said first and second regions and being configured to energize said first and second regions;
   wherein at least one of said first and second regions defines a performance enhancing slit that is devoid of said transparent layer; and
   wherein said first and second regions each include a tab of transparent layer integrally extending from the respective first and second region and with the tab extending into said outer region to enable said feeding arrangement to couple to said first and second regions in said outer region and without disrupting a field of view through said substrate.

28. The window assembly of claim 27 wherein each of said first and second peripheries include an outer edge and opposing inner edge, and one side edge and an opposing side edge, wherein said section cut is further defined by said inner edge of each of said first and second peripheries, and wherein said inner edge of said first periphery and said inner edge of said second periphery each have a linear configuration and extend substantially parallel to one another.

29. The window assembly of claim 27 wherein said first and second regions are electrically disconnected from one another on said substrate.

30. The window assembly of claim 27 wherein said transparent layer occupies at least a majority of said surface of said substrate.

* * * * *

UNITED STATES PATENT AND TRADEMARK OFFICE
CERTIFICATE OF CORRECTION

| | | |
|---|---|---|
| PATENT NO. | : 9,960,482 B2 | Page 1 of 1 |
| APPLICATION NO. | : 14/772166 | |
| DATED | : May 1, 2018 | |
| INVENTOR(S) | : Ledion Shkembi | |

It is certified that error appears in the above-identified patent and that said Letters Patent is hereby corrected as shown below:

On the Title Page

Assignee, please delete "AGC FLAT GRASS" and replace with -- AGC FLAT GLASS --

In the Claims

Claim 1, Column 12, Line 26, please delete "second cut" and replace with -- section cut --

Claim 19, Column 14, Line 51, please delete "second cut" and replace with -- section cut --

Claim 23, Column 15, Line 26, please delete "second cut" and replace with -- section cut --

Claim 27, Column 16, Line 21, please delete "second cut" and replace with -- section cut --

Signed and Sealed this
Ninth Day of October, 2018

Andrei Iancu
*Director of the United States Patent and Trademark Office*